United States Patent
McKeen et al.

(10) Patent No.: US 6,785,830 B1
(45) Date of Patent: Aug. 31, 2004

(54) PC RADIO CARD CAPABLE OF OPERATING AT A NONSTANDARD POWER OUTPUT LEVEL BY LIMITING THE CURRENT BEING DRAWN FROM A POWER AMPLIFIER

(75) Inventors: Trent McKeen, Burnaby (CA); Robert M. Lukas, Burnaby (CA); Bruce M. Miller, North Vancouver (CA)

(73) Assignee: Sierra Wireless, Inc., Richmond (CA)

( * ) Notice: Subject to any disclaimer, the term of this patent is extended or adjusted under 35 U.S.C. 154(b) by 411 days.

(21) Appl. No.: 09/621,095

(22) Filed: Jul. 21, 2000

(51) Int. Cl.[7] ............................................... G06F 1/26
(52) U.S. Cl. ................................... 713/320; 455/127.1
(58) Field of Search ............................... 715/300, 320; 455/127, 522, 574; 307/64

(56) References Cited

U.S. PATENT DOCUMENTS

| | | | | |
|---|---|---|---|---|
| 5,307,512 A | * | 4/1994 | Mitzlaff | 455/126 |
| 5,392,023 A | | 2/1995 | Avello et al. | |
| 5,845,216 A | | 12/1998 | Dutkiewicz | |
| 5,893,036 A | * | 4/1999 | Trandai et al. | 455/522 |
| 6,011,323 A | * | 1/2000 | Camp | 307/64 |
| 6,072,995 A | * | 6/2000 | Boesch et al. | 455/127 |
| 6,157,476 A | * | 12/2000 | Angerstein et al. | 359/152 |
| 6,331,936 B1 | * | 12/2001 | Hom et al. | 361/686 |
| 6,343,222 B1 | * | 1/2002 | Jones | 455/574 |
| 6,353,863 B1 | * | 3/2002 | Nakagawa et al. | 710/5 |
| 6,484,014 B1 | * | 11/2002 | Koszarsky | 455/86 |
| 6,487,419 B1 | * | 11/2002 | Freed | 455/522 |

FOREIGN PATENT DOCUMENTS

| | | | | |
|---|---|---|---|---|
| EP | 0525962 | | 2/1993 | |
| JP | 06083527 A | * | 3/1994 | G06F/3/033 |

OTHER PUBLICATIONS

Chelton Microwave, Conversion of Power (DBM to Watts), Aug. 2001.*
Taser International, FAQ about AA Batteries and Battery Chargers.*

* cited by examiner

Primary Examiner—Thomas Lee
Assistant Examiner—Mark Connolly
(74) Attorney, Agent, or Firm—Thelen Reid & Priest LLP

(57) ABSTRACT

A hand-held, PCMCIA cellular radio modem card is described which uses a non-standard power output level. The non-standard power output is defined as the maximum RF power attainable such that the current drawn by the power amplifier does not exceed 400 mA. This definition permits the use of the wireless modem inside hand-held computing devices without the use of an additional battery pack extension.

16 Claims, 3 Drawing Sheets

Standard Power Output Levels

Not Implemented
- 0  +28dBm
- 1  +28dBm
- 2  +28dBm

Implemented
- 3  +24dBm
- 4  +20dBm
- 5  +16dBm
- 6  +12dBm
- 7  +0.8dBm

Non-Standard Power Output Level

Maximum RF Output Power Such that the Power Drawn by the PC Card is Less than 600mA. ~26.5dBm

PC RADIO CARD CAPABLE OF OPERATING AT A NONSTANDARD POWER OUTPUT LEVEL BY LIMITING THE CURRENT BEING DRAWN FROM A POWER AMPLIFIER

BACKGROUND OF THE INVENTION

The present invention relates to personal computer (PC) card radio modems. Small hand-held personal computing devices can use Personal Computer Memory Card Interface Association (PCMCIA) radio modems to connect to a wireless network. PC card radio modems typically use battery power from the hand-held PC or from a battery pack extension.

A problem that exists in prior-art systems in which the wireless modem operates on a network such as the North American AMPS or CDPD network, is a battery pack extension is used to supplement the power supplied to the wireless modem. Typically, hand-held PCs use two AA batteries, which suffer from low capacity and a low peak current capability.

Six different standard RF power levels are required by the CDPD standard (CDPD R1.1 Part 409) and the AMPS standard (IS-19B) for a class III cellular device. With two AA batteries supplying the hand-held PC and the PCMCIA wireless card, it is difficult to achieve the highest RF power level; which, for a class III cellular device, is an output power of 28 dBm where 0 dBm is 1 mW output power. Typically, prior art uses a battery pack extension on the PCMCIA card to achieve the highest RF power output. This is an undesirable solution as the esthetics of the complete product are poor.

It is desirable to have an improved system, which avoids some of the problems of the prior art.

SUMMARY OF THE INVENTION

In one embodiment, the present invention relates to a PC card radio transceiver which uses a non-standard power output level. The non-standard power output level is limited by the peak sustainable current available from the battery inside the hand-held PC. In one embodiment, this current is limited to 600 mA. The non-standard RF power obtainable, given a 600 mA maximum limit, is typically between 24 dBm and 28 dBm (in one implementation, 26.5 dBm). The non-standard power output level has a nominal value less than the nominal value required by the standard, yet is still within the acceptable range (+2, −4 dB) specified in the standard.

The advantage of the present invention is that the radio transceiver in the PC card can operate while attached to a hand-held PC without requiring a battery pack extension. The system allows the two AA batteries of the hand-held PC to produce an acceptable, high-level RF output power.

Implementation of a non-standard RF power level, which is based on a current restriction, requires the automatic leveling circuit (ALC) of the power amplifier to be a current leveling circuit as opposed to a power leveling circuit as in prior art systems. A current leveling circuit achieves the same effect as a power leveling circuit, given the load on the power amplifier remains constant. In practice, this is a reasonable assumption.

DETAILED DESCRIPTION OF THE PREFERRED EMBODIMENT

Figure 1:
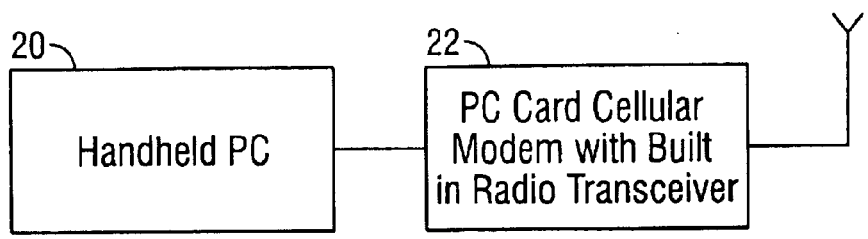
FIG. 1 is a block diagram illustrating a PCMCIA cellular modem attached to a hand-held PC.

FIG. 1 is a block diagram that illustrates a hand-held personal computer 20 and PC card 22. In one embodiment, the PC card is a cellular modem with a built-in radio transceiver.

The hand-held PC 20 sends signals to be transmitted to the PC card cellular modem 22. Additionally, the hand-held PC supplies power for the operation of the PC card cellular modem 22. Typically, two AA batteries in the hand-held PC power both the hand-held PC and the PC card cellular modem 22. Since relatively small batteries are used, the maximum current which can be drawn by the PC card cellular modem 22 is limited to less than what is needed to meet the nominal output power requirements of IS-19B and CDPD Part 409 standards given present power amplifier and duplexer technologies. In one embodiment, the PC card cellular modem 22 should not draw more than 600 mA of current.

Figure 2:
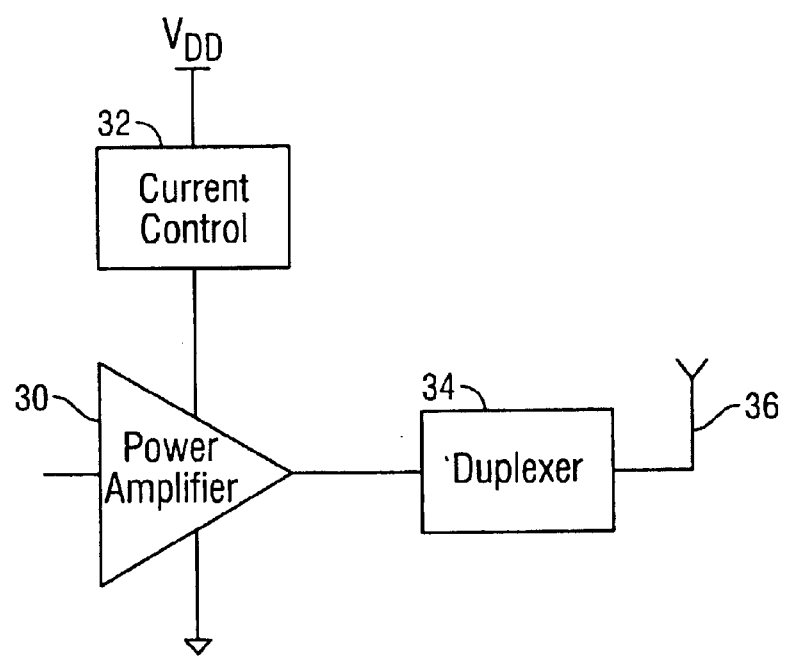
FIG. 2 is a diagram illustrating the power amplifier, current leveling circuit, duplexer and antenna used in the PC card cellular radio transceiver of one embodiment of present invention.

FIG. 2 is a simplified diagram of the elements in the PC card cellular modem of one embodiment of the present invention. A current leveling circuit 32 controls the current supplied to power amplifier 30 and hence indirectly controls the output power of amplifier 30. In a PC card cellular modem, the current supplied to the power amplifier makes up a large percentage of the total current consumed by the device. The output of the power amplifier 30 is sent to a duplexer 34, then out the antenna 36.

In the present invention, the current leveling circuit 32 limits the current used by the power amplifier 30 at the highest power output level. This highest power output level is the non-standard power output level described below. In one embodiment, the current leveling circuit 32 limits the current drawn by the power amplifier 30 to 400 mA when it is transmitting at the highest output power level. The current consumption of the entire card is therefore limited to 600 mA.

Figures 3, 4:
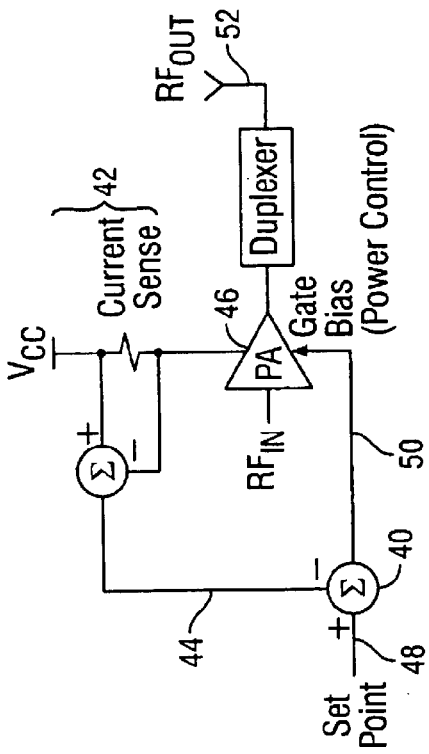
FIG. 3 is a diagram illustrating both the implemented and non-implemented standard power output levels as well as the non-standard power output level of one embodiment of present invention.
FIG. 4 is a block diagram illustrating one embodiment of the current leveling system sent invention.

FIG. 3 illustrates the RF output levels for the standard and non-standard power outputs for CDPD standard R.1.1 Part 409 and AMPS standard IS-19B. There are six standard output power levels for a class III cellular device. The standard, nominal power output levels range from 8 to 28 dBm in 4 dB steps. In one embodiment, the non-standard power output level is between the highest standard power level, which is not implemented (28 dBm), and the highest implemented power level (24 dBm). In one embodiment, by limiting the current draw by the power amplifier to 400 mA or less (the total PC card current draw to 600 mA or less), the non-standard power output level is about 26.5 dBm. This level is below the nominal 28 dBm power level specified in the standard, yet still falls within the acceptable range of +2 dB to −4 dB from nominal specified in the standard.

FIG. 4 is a block diagram of a circuit to implement one embodiment of the present invention. A set point value 48 is sent to adder 40 and combined with a feedback value on line 44 from current-sensor 42 to produce a gate bias (power control) signal for power amplifier 46. The set point values are controlled by the micro-processor. Each set point value corresponds to a power output level for the power amplifier 46. The current leveling circuit limits the power output by the power amplifier. In a preferred embodiment, the maximum set point value is such that the current drawn by the power amplifier is less than 400 mA.

Figure 5:
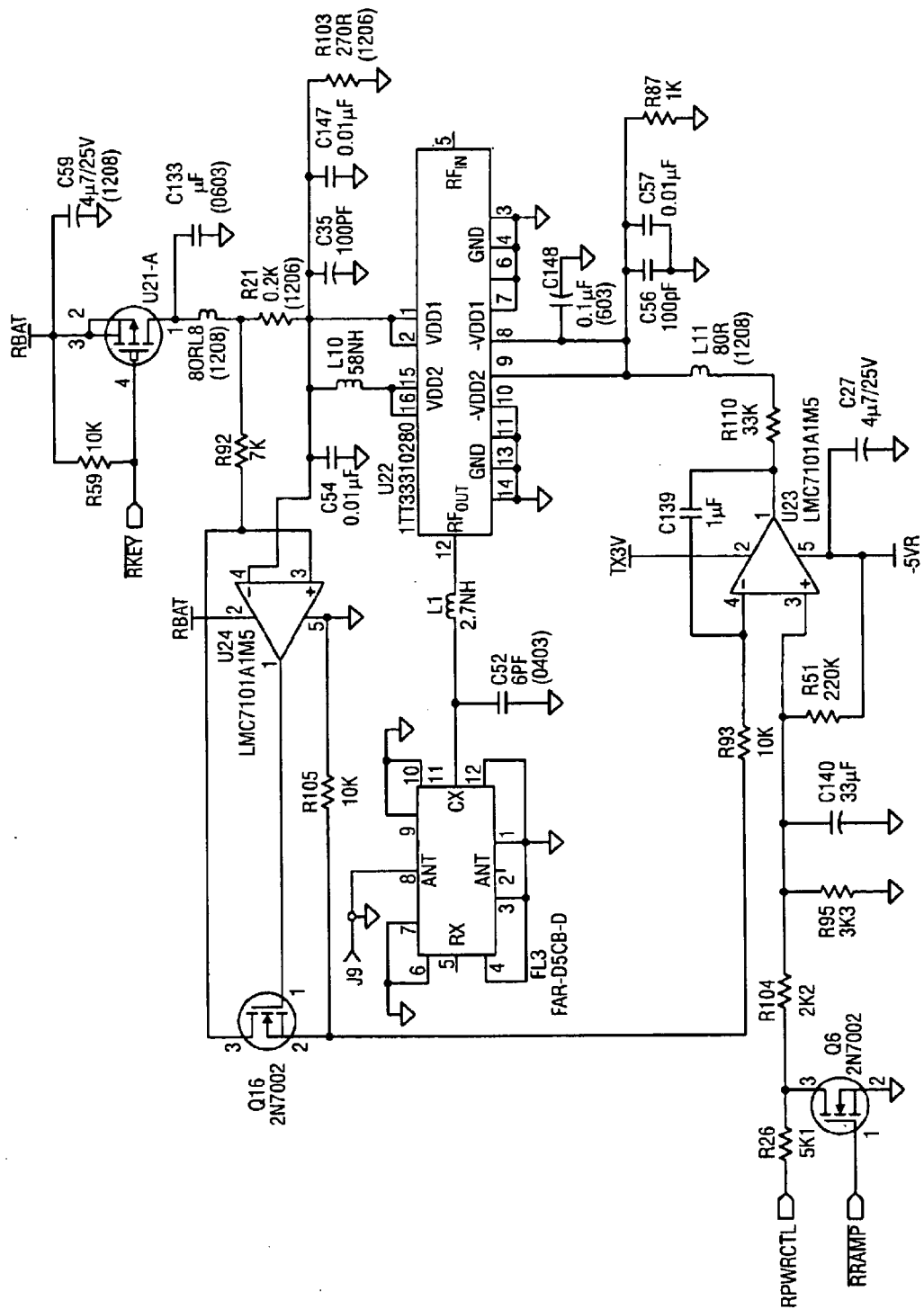
FIG. 5 is a schematic illustrating one embodiment of the current leveling circuit for one embodiment of the present invention.

FIG. 5 illustrates details of one embodiment of the current leveling circuitry for operation with the PC card radio transceiver of the present invention.

Other modifications and implementations will occur to those skilled in the art, without departing from the spirit and scope of the present invention. Accordingly, the above description is not intended to limit the invention, which is to be limited only by the following claims.

What is claimed is:

1. A PC radio card adapted to be connected to a hand-held personal computer and adapted to be powered by a battery that also powers said hand-held personal computer, the PC radio card using a number of output power levels controlled by current supplied to a power amplifier in the PC radio card, the output power levels including multiple implemented standard power output levels and a nonstandard power output level, the nonstandard power output level being greater than the multiple implemented standard power output levels but less than an unimplemented standard power output level, wherein a current control circuit, having an automatic leveling circuit, in the PC radio card prevents a current drawn by said power amplifier from said battery from exceeding a predetermined current limit when the PC radio card is transmitting at the nonstandard power output level.

2. The PC radio card of claim 1 wherein the non-standard power output level is such that the current drawn by the power amplifier is 400 mA or less.

3. The PC radio card of claim 1 wherein said battery comprises two AA batteries.

4. The PC radio card of claim 1 wherein the non-standard power output level is less than 28 dBm and more than 24 dBm.

5. A PC radio card adapted to be connected to a hand-held personal computer and adapted to be powered by a battery that also powers said hand-held personal computer, the PC radio card using a number of output power levels set by current supplied to a power amplifier in the PC radio card, the output power levels including multiple implemented standard power output levels and a nonstandard power output level, wherein a current control circuit, having an automatic leveling circuit, in the PC radio card prevents a current drawn by said power amplifier from said battery from exceeding a predetermined current limit when the PC radio card is transmitting at the nonstandard power output level.

6. The PC radio card of claim 5 wherein the non-standard power output level is greater than the implemented standard power output levels but less than an unimplemented standard power output level.

7. The PC radio card of claim 5 wherein said battery comprises two AA batteries.

8. The PC radio card of claim 5 wherein the non-standard power output level is less than 28 dBm and more than 24 dBm.

9. A system including:
a battery-powered hand-held personal computer; and
a PC radio card connected to the hand-held personal computer and powered by a battery that also powers the hand-held personal computer, the PC radio card using a number of output power levels set by current supplied to a power amplifier in the PC radio card, the output power levels including multiple implemented standard power output levels and a nonstandard power output level, the nonstandard power output level being greater than the multiple implemented standard power output levels but less than an unimplemented standard power output level, wherein a current control circuit, having an automatic leveling circuit, in the PC radio card prevents a current drawn by said power amplifier from said battery from exceeding a predetermined current limit when the PC radio card is transmitting at the nonstandard battery power output level.

10. The system of claim 9 wherein the nonstandard power level is such that the current drawn by the power amplifier is 400 mA or less.

11. The system of claim 9 wherein said battery comprises two AA batteries.

12. The system of claim 9 wherein the nonstandard power level limits the current supplied by the hand-held personal computer to the PC radio card to less than a given amount.

13. A PC card transceiver including:
an antenna;
an amplifier operably connected to the antenna:
a current controller, having an automatic leveling circuit, operably connected to the amplifier to set the power output of the transceiver, the current controller adapted to produce a number of standard transceiver power output levels and a nonstandard transceiver output power level, and operable to limit the amplifier current when said PC card transceiver is transmitting at the nonstandard transceiver output power level.

14. The PC card of claim 13, further comprising a duplexer operatively positioned between the amplifier and the antenna.

15. The PC card of claim 13 wherein the non-standard power output level is greater than the implemented standard power output levels but less than an unimplemented standard power output level.

16. The PC card transceiver of claim 13 wherein the amplifier is limited to 400 mA of current draw from the host battery.

* * * * *

UNITED STATES PATENT AND TRADEMARK OFFICE
CERTIFICATE OF CORRECTION

PATENT NO. : 6,785,830 B1
DATED : August 31, 2004
INVENTOR(S) : Trent McKeen, Robert M. Lukas and Bruce M. Miller It is certified that error appears in the above-identified patent and that said Letters Patent is hereby corrected as shown below:

Column 2,
Lines 3 and 7, after "embodiment of" add -- the --.
Line 10, replace "sent" with -- of the present --.

Signed and Sealed this

Twenty-second Day of March, 2005

JON W. DUDAS
*Director of the United States Patent and Trademark Office*